United States Patent
Dekel et al.

(10) Patent No.: US 12,517,595 B2
(45) Date of Patent: Jan. 6, 2026

(54) TOUCH-SENSITIVE INPUT REGION FOR ELECTRONIC STYLUS

(71) Applicant: Microsoft Technology Licensing, LLC, Redmond, WA (US)

(72) Inventors: Shoham Dekel, Tel Aviv (IL); Uri Ron, Kfar Saba (IL); Vadim Mishalov, Tel Aviv (IL); Assaf Bar-Ness, Ness Zionna (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/696,163

(22) PCT Filed: Oct. 4, 2022

(86) PCT No.: PCT/US2022/077506
§ 371 (c)(1),
(2) Date: Mar. 27, 2024

(87) PCT Pub. No.: WO2023/060060
PCT Pub. Date: Apr. 13, 2023

(65) Prior Publication Data
US 2024/0385701 A1    Nov. 21, 2024

(30) Foreign Application Priority Data
Oct. 5, 2021   (NL) ..................... 2029321

(51) Int. Cl.
*G06F 3/0354*      (2013.01)
*G06F 3/01*          (2006.01)
*G06F 3/038*        (2013.01)

(52) U.S. Cl.
CPC .......... *G06F 3/03545* (2013.01); *G06F 3/016* (2013.01); *G06F 3/03547* (2013.01); *G06F 3/038* (2013.01); *G06F 2203/0339* (2013.01)

(58) Field of Classification Search
CPC ................ G06F 3/03545; G06F 3/016; G06F 3/03547; G06F 2203/0339; G06F 3/038;
(Continued)

(56) References Cited

U.S. PATENT DOCUMENTS 9,575,573 B2 *  2/2017  Chang ................. G06F 3/03545
9,696,819 B2 *  7/2017  Mercea ................ G06F 3/0383
(Continued)

FOREIGN PATENT DOCUMENTS

| EP | 2924545 A1 | 9/2015 | |
| EP | 4030268 B1 * | 8/2024 | ............. G06F 3/016 |
| WO | 2020231549 A1 | 11/2020 | |

OTHER PUBLICATIONS

International Search Report and Written Opinion Issued in PCT Application No. PCT/US2022/077506 Jan. 27, 2023, 14 pages.
(Continued)

*Primary Examiner* — Ricardo Osorio
(74) *Attorney, Agent, or Firm* — Alleman Hall & Tuttle LLP

(57) ABSTRACT

An electronic stylus includes a stylus body, a touch-sensitive input region disposed along at least a portion of the stylus body, a haptic feedback device, and a stylus controller configured to receive an indication of user physical contact with the touch-sensitive input region. The user physical contact is classified as a recognized contact type of a plurality of different recognized contact types, based at least in part on one or more touch context parameters. The haptic feedback device is activated with predefined haptic characteristics corresponding to the recognized contact type, and differing from predefined haptic characteristics corresponding to other recognized contact types of the plurality of different recognized contact types.

19 Claims, 10 Drawing Sheets

(58) Field of Classification Search
CPC .............. G06F 3/04847; G06F 3/0485; G06F 3/04883
See application file for complete search history.

(56) References Cited

U.S. PATENT DOCUMENTS

| | | | |
|---|---|---|---|
| 9,727,161 B2* | 8/2017 | Hinckley | ............ G06F 3/03545 |
| 9,785,259 B2 | 10/2017 | Cueto | |
| 9,946,365 B2* | 4/2018 | Cueto | ................ G06F 3/03545 |
| 10,133,370 B2 | 11/2018 | Evreinov | |
| 10,712,840 B2* | 7/2020 | Bikumala | ............... G06F 3/016 |
| 10,877,575 B2 | 12/2020 | Berger, Jr. | |
| 2014/0253522 A1* | 9/2014 | Cueto | .................. G06F 3/0383 |
| | | | 345/179 |
| 2016/0179222 A1* | 6/2016 | Chang | ................ G06F 3/03545 |
| | | | 345/179 |
| 2016/0188015 A1 | 6/2016 | Song et al. | |
| 2019/0113986 A1* | 4/2019 | Bikumala | ............... G06F 3/017 |
| 2019/0384402 A1 | 12/2019 | Huizar | |
| 2020/0363880 A1* | 11/2020 | Bogan | ................ G06F 3/03545 |

OTHER PUBLICATIONS

Krol, et al., "Haptic Feedback in Remote Pointing", In Proceedings of the 27th International Conference in CHI Extended Abstracts on Human Factors in Computing Systems, Apr. 4, 2009, pp. 3763-3768.

Kruijf, et al., "Multilayer Haptic Feedback for Pen-Based Tablet Interaction", In Proceedings of the CHI Conference on Human Factors in Computing Systems, May 4, 2019, 14 pages.

Lee, et al., "Haptic Pen: A Tactile Feedback Stylus for Touch Screens", In Proceedings of the 17th Annual ACM Symposium on User Interface Software and Technology, Oct. 24, 2004, pp. 291-294.

Search Report and Written Opinion Issued in Netherlands Patent Application No. N2029321, Completion Date: May 31, 2022, 8 Pages.

* cited by examiner

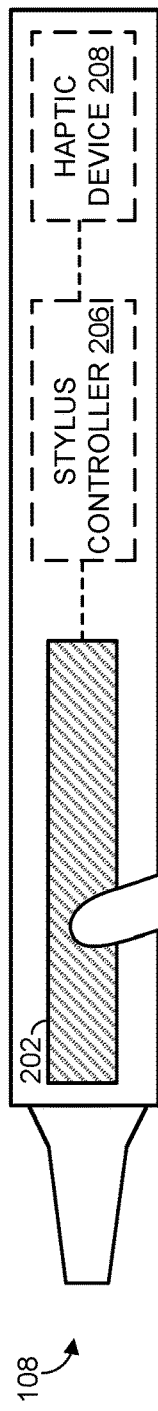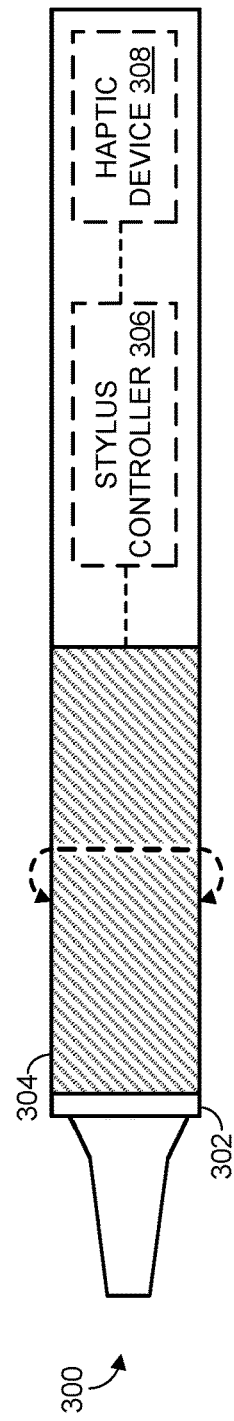
FIG. 2
FIG. 3

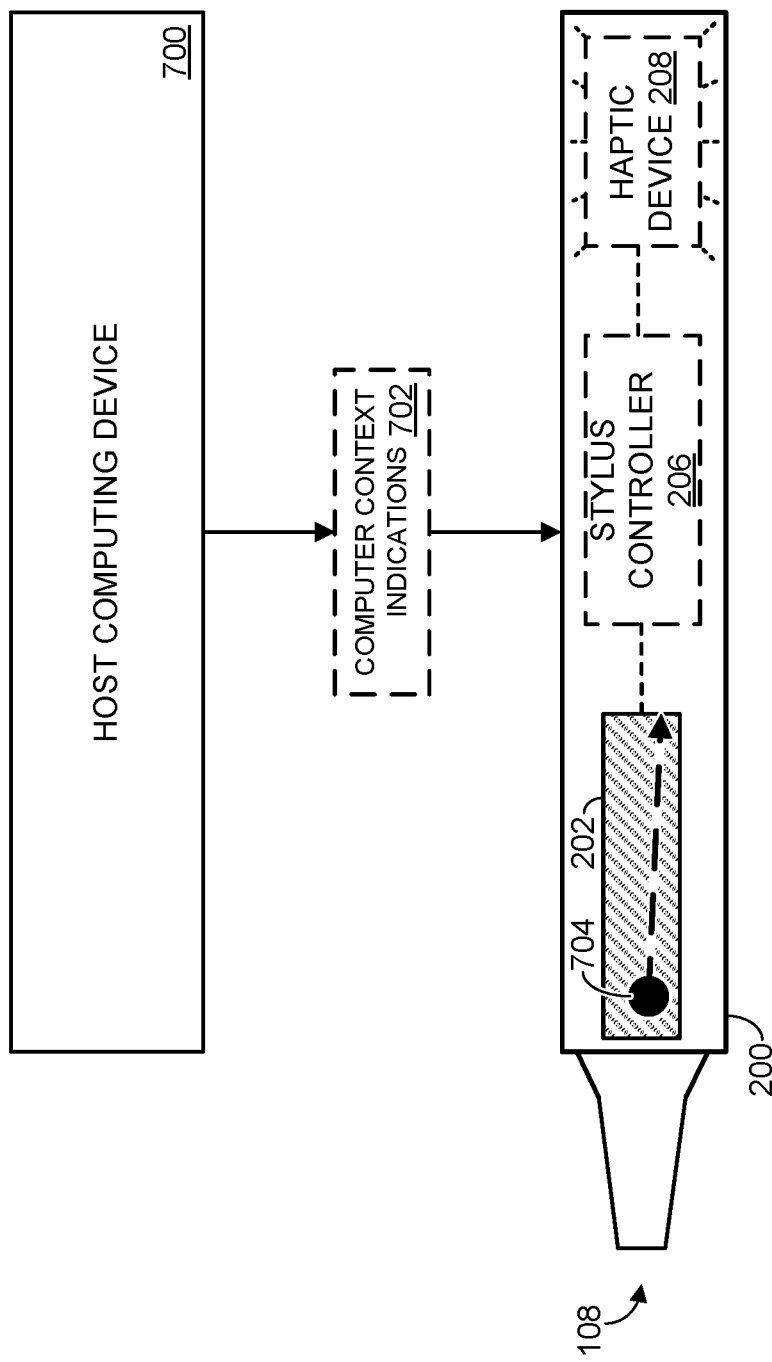

TOUCH-SENSITIVE INPUT REGION FOR ELECTRONIC STYLUS

CROSS REFERENCE TO RELATED APPLICATIONS

The present application is a U.S. National Phase of International Patent Application Serial No. PCT/US2022/077506 entitled "TOUCH-SENSITIVE INPUT REGION FOR ELECTRONIC STYLUS", filed Oct. 4, 2022, which claims priority to Netherlands Patent Application Serial No. 2029321, filed Oct. 5, 2021, the entire contents of each of which are hereby incorporated by reference for all purposes.

BACKGROUND

An electronic stylus may be used to provide input to a computing device. For example, when the computing device includes a touch-sensitive display, the stylus may be used to provide touch input to the computing device by bringing the stylus into proximity with the display. In some examples, the electronic stylus may include one or more input mechanisms (e.g., buttons, switches) that can be manipulated to provide different types of input to the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An electronic stylus includes a stylus body, a touch-sensitive input region disposed along at least a portion of the stylus body, a haptic feedback device, and a stylus controller configured to receive an indication of user physical contact with the touch-sensitive input region. The user physical contact is classified as a recognized contact type of a plurality of different recognized contact types, based at least in part on one or more touch context parameters. The haptic feedback device is activated with predefined haptic characteristics corresponding to the recognized contact type, and differing from predefined haptic characteristics corresponding to other recognized contact types of the plurality of different recognized contact types.

BRIEF DESCRIPTION OF THE DRAWINGS

FIG. 2 schematically shows an example electronic stylus including a touch-sensitive input region.

FIG. 3 schematically shows another example electronic stylus including a touch-sensitive input region.

FIGS. 7A-7C schematically illustrate receiving one or more computer context indications from a host computing device.

DETAILED DESCRIPTION

An electronic stylus may provide input to a computing device in various suitable ways, depending on the capabilities of both the stylus and the computing device. For example, when the computing device includes a touch-sensitive display, the electronic stylus may be used to provide touch input to the computing device when the electronic stylus is brought into proximity with the display surface. Similarly, the electronic stylus may in some cases include various input mechanisms (e.g., switches, buttons) that can be manipulated or otherwise interacted with by a user to provide input to the computing device.

The present disclosure is directed to an electronic stylus that includes a touch-sensitive input region disposed along at least a portion of the stylus body. In other words, at least a portion of the electronic stylus may be configured to detect when a separate object (e.g., such as a human finger, another part of a user's body, or any other input object) makes contact with that portion of the stylus. By interacting with the touch-sensitive input region, a user may control functionality of the electronic stylus, and/or provide input to a separate computing device. Furthermore, the electronic stylus may include a haptic feedback device configured to provide different types of haptic feedback in response to different types of contact detected at the touch-sensitive input region. Specifically, a stylus controller of the electronic stylus may detect a user physical contact at the touch-sensitive input region, classify the detected contact as a recognized contact type of a plurality of different recognized contact types, then activate the haptic feedback device to provide haptic feedback having predefined characteristics corresponding to the recognized contact type. In this manner, the user may be able to more effectively and intuitively control an electronic stylus and/or separate computing device by providing input to a touch-sensitive input region of the electronic stylus.

Figure 1:
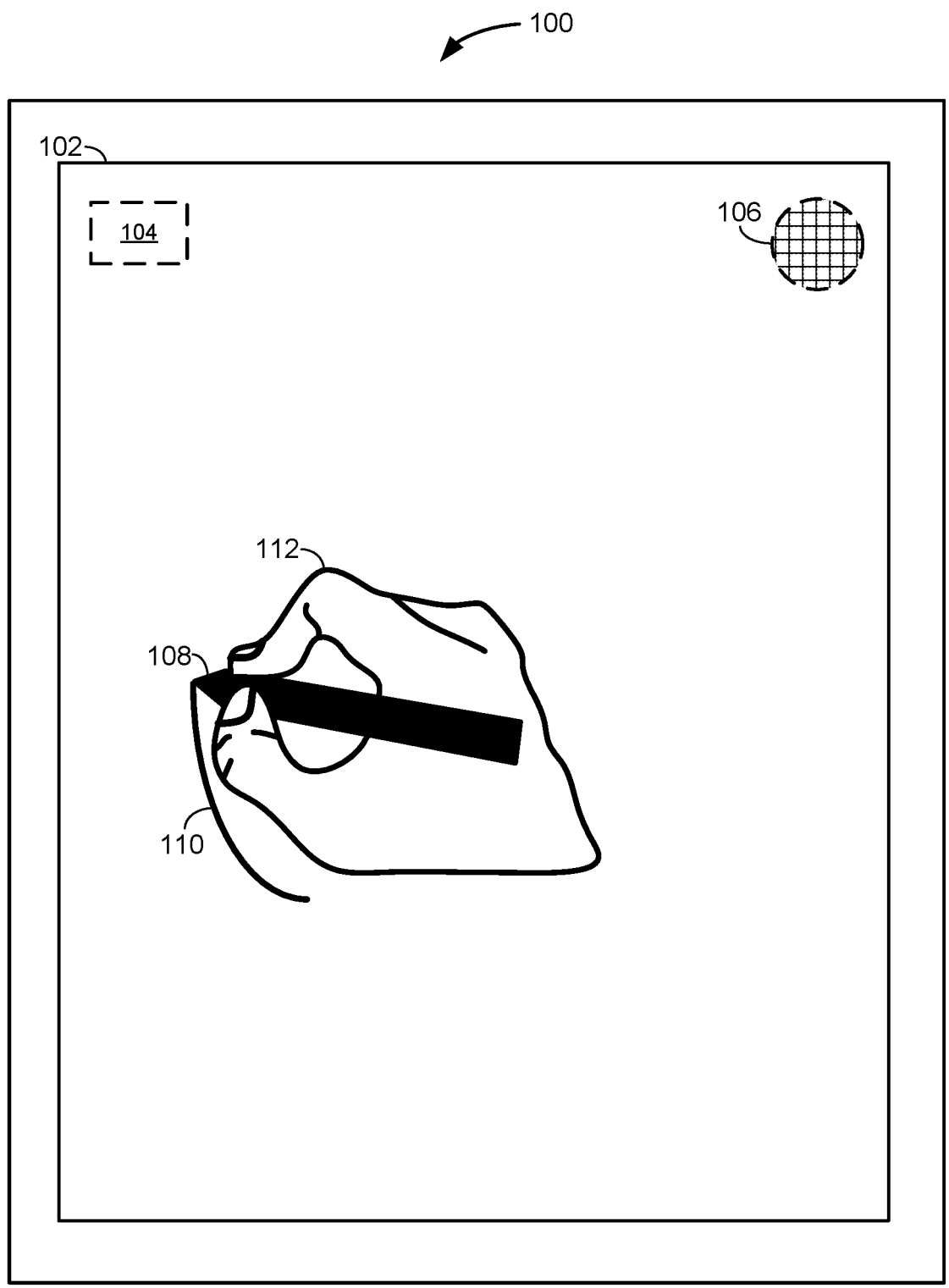
FIG. 1 schematically shows an example host computing device communicatively coupled with an electronic stylus.

FIG. 1 schematically shows an example host computing device 100, including a touch-sensitive display 102. Both the host computing device 100 and touch-sensitive display 102 may have any suitable sizes and dimensions. In some examples, a host computing device may include more than one touch-sensitive display. For example, a host computing device as described herein may refer to a device having two or more touch-sensitive displays in a foldable or static configuration, as well as single-display devices such as host computing device 100. As non-limiting examples, a host computing device may be implemented as, or be used in tandem with, a laptop computer, smartphone, tablet, computer monitor, fitness device (e.g., smartwatch), media center device, automotive computing device, etc. In some cases, a "host computing device" as described herein may be implemented as computing system 900 described below with respect to FIG. 9.

It will be understood that the devices and components depicted in FIG. 1 are simplified and schematic in nature. In practical examples, "host computing devices" may include additional or alternative components to those described herein; may have any suitable shapes, sizes, and form factors; and may have any suitable capabilities. For example, though the present disclosure primarily focuses on using an electronic stylus in tandem with a separate computing device that includes a touch-sensitive display, it will be understood that this is not limiting. Rather, the techniques described herein may be applied to an electronic stylus regardless of whether the stylus is currently used in tandem with a computing device. Furthermore, an electronic stylus as described herein may be used with (e.g., provide inputs to) any suitable computing device, regardless of whether the computing device includes a touch-sensitive display.

Host computing device 100 includes a controller 104 configured to perform any or all computing functions of the host computing device. For example, controller 104 may be configured to receive various types of inputs from an electronic stylus, and respond to such inputs accordingly. As another example, the controller may be configured to transmit information (e.g., computer context indications) to the electronic stylus, and the electronic stylus may consider such information when providing haptic feedback based on input directed to a touch-sensitive input region of the stylus, as will be described in more detail below.

Controller 104 may include one or more computer processors, or other suitable logic hardware, working in tandem with one or more volatile or non-volatile data storage devices, or other suitable storage hardware. In some examples, controller 104 may be implemented via logic subsystem 902 and storage subsystem 904 described below with respect to FIG. 9.

Touch-sensitive display 102 includes a plurality of touch-sensing electrodes, including electrodes 106, which may be configured to detect proximity of input objects to the touch-sensitive display. Input objects may include, as examples, human digits (e.g., fingers, thumbs), passive styluses, electronic styluses, and other suitable electronic devices or non-electronic objects. The touch-sensing electrodes may detect proximity of an input object in various different ways depending on the implementation. In general, proximity of an input object to the display surface (e.g., directly contacting the display surface, or hovering above the display surface) may affect electrical conditions at the touch-sensing electrodes in a measurable way. By monitoring electrical conditions at the plurality of touch-sensing electrodes, controller 104 may determine the two-dimensional position of the touch input relative to the surface of the display. Touch-sensing electrodes 106 and controller 104 are shown with dashed lines to indicate that they are disposed beneath the display surface and would not ordinarily be visible from the illustrated perspective.

In FIG. 1, a stylus 108 is in proximity to the surface of touch-sensitive display 102. The stylus may, for example, take the form of an electronic stylus that includes an internal power supply and internal logic components configured to transmit electrical signals that are detectable by the host computing device. In some examples, the electronic stylus may be configured to transmit data to the host computing device—e.g., based on detecting contact at a touch-sensitive input region of the electronic stylus. Such data may be communicated in any suitable way, such as via a suitable radio-frequency communications protocol (e.g., Bluetooth®), and/or via electrostatic communication (e.g., driving an internal electrode of the electronic stylus with a drive signal that encodes the data to be transmitted).

Proximity of the electronic stylus to the surface of the touch-sensitive display is detected by the display device as a touch input, resolvable to a particular location relative to the display surface. This location may be provided to an operating system and/or one or more software applications of the host computing device as an input that controls or changes behavior of the display device. It will be understood that "proximity" of an electronic stylus to a display surface may include either or both of direct contact between the stylus and display surface, and "hovering" of the stylus at a position near (e.g., within several centimeters of) the display surface.

In the example of FIG. 1, the stylus includes a pointed tip that is making contact with the surface of the touch-sensitive display. For example, the stylus tip may include an internal conductive electrode that is configured to electrostatically interact with touch-sensing electrodes of the display device. It will be understood, however, that stylus 108 is non-limiting, and that the techniques described herein may be applied to styluses (and/or other suitable electronic devices) having any suitable configurations and structures. For example, each end of the electronic stylus may have any suitable shape (e.g., pointed, rounded, flat, wedge-shaped), and the electronic stylus may include any number of different electrodes having any suitable positions within the body of the electronic stylus.

In FIG. 1, the host computing device is graphically rendering the touch input as a line 110 that reflects detected movements of the electronic stylus relative to the display surface over time. It will be understood that line 110 is only included for the sake of illustration, and that a host computing device as described herein need not graphically render detected touch inputs.

FIG. 1 also shows a human hand 112 holding electronic stylus 108. As will be discussed in more detail below, the electronic stylus may include a touch-sensitive input region disposed along at least a portion of a body of the electronic stylus. Thus, the user may interact with the touch-sensitive input region while holding the stylus—e.g., by using one or more digits to tap or swipe along the touch-sensitive input region. This may control functionality of the electronic stylus and/or host computing device 100.

Turning now to FIG. 2, another view of electronic stylus 108 is schematically shown. Stylus 108 includes a stylus body 200 and a touch-sensitive input region 202 disposed along a portion of the stylus body. As shown, a human finger 204 is touching the touch-sensitive input region. In the example of FIG. 2, the human finger corresponds to a hand that is not currently holding the electronic stylus. It will be understood, however, that this is only done for the sake of visual clarity. In general, a user may interact with a touch-sensitive input region of an electronic stylus regardless of whether they are currently holding the stylus (e.g., to write, draw, or otherwise provide stylus inputs to another computing device). Furthermore, it will be understood that the present disclosure is not limited to input originating from "human fingers." Rather, a user may interact with a touch-sensitive input region using any suitable digit (e.g., fingers, thumbs), and/or any other suitable input object. As used herein, such input is referred to as "user physical contact" with the touch-sensitive input region.

As will be described in more detail below, data relating to the user physical contact with the touch-sensitive input region may be reported to a stylus controller 206 of the electronic stylus. The stylus controller may then activate a haptic feedback device 208 to provide haptic feedback having predefined haptic characteristics that correspond to a recognized type of the user physical contact. Thus, different types of contact (e.g., recognized gestures, or contacts provided under different contexts) may correspond to different types of haptic feedback, which can enable the user to more effectively and intuitively control functions of the stylus and/or a separate computing device communicatively coupled with the stylus.

As discussed above, it will be understood that the specific shape and structure of electronic stylus 108 is non-limiting. For example, in FIG. 2, the electronic stylus has a cylindrical stylus body 200 and a pointed tip. However, it will be understood that the techniques described herein may be applied to an electronic stylus having any suitable size, shape, and configuration—e.g., the stylus body may have any suitable cross-sectional shape (e.g., non-circular shapes), and either or both ends of the stylus may be pointed, rounded, flat, wedge-shaped, etc.

As with controller 104 of the host computing device, stylus controller 206 may be implemented via any suitable combination of logic processing componentry and data storage componentry. Stylus controller 206 may be configured to perform any or all computing functions of the electronic stylus—e.g., transmitting data to a separate computing device, classifying contacts detected at the touch-sensitive input region, and/or activating the haptic feedback device to provide haptic feedback. Stylus controller 206 may include one or more computer processors, or other suitable logic hardware, working in tandem with one or more volatile or non-volatile data storage devices, or other suitable storage hardware. In some examples, stylus controller 206 may be implemented via logic subsystem 902 and storage subsystem 904 described below with respect to FIG. 9.

Haptic feedback device 208 may take the form of any suitable device or mechanism for providing haptic feedback. In general, the haptic feedback device may be controllable by the stylus controller to provide haptic feedback having controllable haptic characteristics, such as a vibration frequency, intensity, and/or duration, based on a recognized contact type of the user physical contact with the touch-sensitive input region. As non-limiting examples, haptic feedback device 208 may take the form of an eccentric rotating mass (ERM) actuator or a linear resonant actuator (LRA).

The present disclosure primarily focuses on a scenario where the electronic stylus includes a single haptic feedback device. As used herein, such a "haptic feedback device" can include one or more different haptic motors that can be controlled independently. Furthermore, in some cases, an electronic stylus may include two or more different haptic feedback devices having different locations within the structure of the electronic stylus. In such cases, the techniques described herein may apply to any or all of the different haptic feedback devices—e.g., when haptic feedback is provided with predetermined haptic characteristics as will be described in more detail below, this can include activating any or all of the different haptic feedback devices of the electronic stylus. For example, different haptic effects may be achieved by controlling different haptic feedback devices to cooperatively use different haptic frequencies, intensities, durations, patterns, etc.

Any suitable touch-sensing technology may be used to implement the touch-sensitive input region. As one non-limiting example, the touch-sensitive input region may comprise a plurality of individual capacitive pads. When a conductive object (such as a human finger) is brought into proximity with a capacitive pad, electrical conditions (e.g., capacitance) at the pad may be changed in a measurable way, and this change may be reported to the stylus controller. By evaluating changes in capacitance at each of the plurality of capacitive pads of the touch-sensitive input region, a user physical contact with the touch-sensitive input region may be resolved to a particular contact location. This contact location may be used for downstream processing—e.g., for classifying the contact as a recognized contact type. While the present disclosure primarily focuses on capacitive touch-sensing technologies, it will be understood that a touch-sensitive input region disposed on an electronic stylus may use any suitable touch-sensing technologies, and that a plurality of individual capacitive pads is only one non-limiting example. As another non-limiting example, the touch-sensitive input region may detect touch contacts optically.

The specific manner in which a user physical contact detected at the touch-sensitive input region is expressed may vary depending on the implementation. For example, depending on the specific configuration of the touch-sensitive input region, the resolution of the touch-sensitive input region may vary. In general, a portion of a human digit (or other input object) touching the touch-sensitive input region may form a two-dimensional patch on the surface of the touch-sensitive input region. In cases where this two-dimensional patch is detected by multiple different electrodes (e.g., capacitive pads) of the touch-sensitive input region, then the stylus controller may use any suitable technique for resolving the detected input to a particular contact position. For example, the stylus controller may make use of one or more heuristics and/or machine learning models to resolve input detected at two or more different electrodes to a single contact position. This contact position may be expressed as a single point, a two-dimensional patch, a contact position and an estimated hover distance, etc.

In cases where multiple distinct patches are detected (e.g., due to different human digits contacting the touch-sensitive input region, or different portions of the same digit), each of the different detected contact patches may be reported to the stylus controller separately. In some cases, one or more heuristics and/or machine learning models may be used to distinguish between different detected contacts corresponding to different specific fingers of the user's hand, and the contact positions of each different finger may in some cases be tracked independently.

In FIG. 2, the touch-sensitive input region is visually distinct from the rest of stylus body 200. It will be understood, however, that this is only done for the sake of illustration. In general, the touch-sensitive input region need not be visually or texturally distinct from other portions of the stylus body that are not touch sensitive. For example, the touch-sensitive input region may be painted or coated in such a manner that it does not look and/or feel different from other portions of the electronic stylus. In other examples, however, the touch-sensitive input region may be deliberately painted and/or coated in such a manner so as to distinguish it from non-touch-sensing portions of the stylus body—e.g., to make it easier for the user to find the touch-sensitive input region with their finger while holding the stylus.

Furthermore, it will be understood that the shape of the touch-sensitive input region shown in FIG. 2 (e.g., an elongate strip disposed along a portion of the stylus body) is non-limiting. In other examples, the touch-sensitive input region may have another suitable shape and/or size relative to other components of the electronic stylus. For example, FIG. 3 schematically shows another example electronic stylus 300, including a stylus body 302 and a touch-sensitive input region 304. In this example, the touch-sensitive input region takes the form of a ring that encircles the stylus body, as indicated by the dashed arrow shown wrapping around stylus body 302 in FIG. 3. This may provide a larger area in which the user can provide touch input to the stylus, and/or enable the electronic stylus to detect contacts between the touch-sensitive input region and multiple digits of the user's hand.

Notably, in the example of FIG. 3, the touch-sensitive input region encircles only a limited length of the stylus body—e.g., the touch-sensitive input region defines a touch-sensitive strip that covers part of the stylus body proximate to the stylus tip. In other examples, however, the touch-sensitive input region may cover any suitable portion of the stylus body. For example, an electronic stylus as described herein may include a touch-sensitive input region that covers substantially the entire stylus body, meaning any contact on the stylus body may be detectable by the stylus controller as a user physical contact. In general, the touch-sensitive input region may have any suitable shape and size relative to the rest of the electronic stylus, depending on the implementation. Furthermore, in some examples, an electronic stylus may have two or more separate touch-sensitive input regions, and each of the two or more separate touch-sensitive input regions may in some cases have different sizes and/or shapes.

As with electronic stylus 108, stylus 300 also includes a stylus controller 306 and a haptic feedback device 308. Each of stylus controller 306 and haptic feedback device 308 may be implemented substantially as described above with respect to stylus controller 206 and haptic feedback device 208 of electronic stylus 108.

Figure 4:
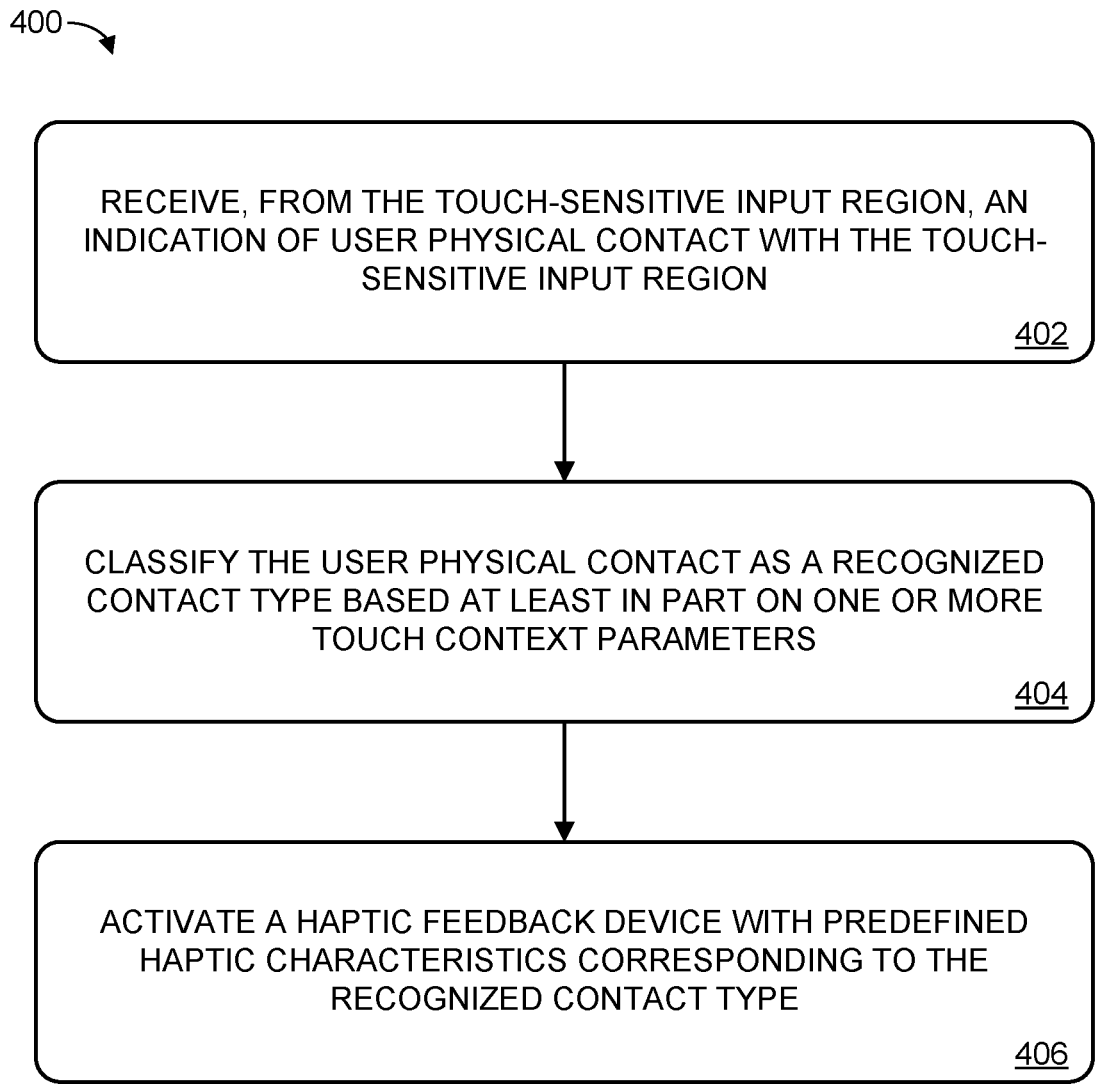
FIG. 4 illustrates an example method for an electronic stylus.

As discussed above, an electronic stylus may provide different types of haptic feedback in response to different types of user physical contact detected at the touch-sensitive input region. Accordingly, FIG. 4 illustrates an example method 400 for providing haptic feedback at an electronic stylus. Method 400 may be implemented by any suitable computer logic componentry of one or more different computing devices. Method 400 is primarily described as being performed by a stylus controller, such as stylus controllers 206 and 306 described above. In some cases, however, one or more steps of method 400 may be performed by a host computing device that is separate from the electronic stylus—e.g., by controller 104 of host computing device 100. In general, a device that implements method 400 may have any suitable capabilities, hardware configuration, and form factor. In some cases, method 400 may be implemented by computing system 900 described below with respect to FIG. 9.

At 402, method 400 includes receiving, from the touch-sensitive input region, an indication of user physical contact with the touch-sensitive input region. For example, as is shown in FIG. 2, a human finger 204 is contacting touch-sensitive input region 202. Based on changes in detected conditions at the touch-sensitive input region (e.g., changes in measured capacitance at one or more individual capacitive pads), the user physical contact with the input region may be resolved to a particular contact position (e.g., a single point, or a two-dimensional contact patch). This may be done by the stylus controller—e.g., the stylus controller may receive raw data from the touch-sensitive input region and derive the contact position from the received data. Alternatively, the stylus controller may receive some indication of the contact position from another logic component of the stylus, such as a dedicated touch controller for the touch-sensitive input region.

In any case, the stylus controller receives information useable to determine the position of a user physical contact with the touch-sensitive input region. Such information may be received with any suitable frequency. For example, as a human digit moves across the touch-sensitive input region, the movement may be reported as a series of different contact positions corresponding to different points in time. As non-limiting examples, contacts on the touch-sensitive input region may be reported at a frequency of 30 Hz, 60 Hz, 120 Hz, etc. In some cases, the frequency at which contacts on the touch-sensitive input region are detected and reported may change over time—e.g., based on device settings.

Furthermore, in cases where the stylus is communicatively coupled with a separate computing device (e.g., host computing device 100), a detected contact at the touch-sensitive input region may be reported to the host computing device in any suitable way. For example, the electronic stylus may transmit the detected contact position as one or more coordinates relative to a coordinate system of the touch-sensitive input region. Alternatively, the electronic stylus may report the duration and/or detected movement of the contact, without providing specific information regarding where the contact is positioned relative to the touch-sensitive input region. Such data may be transmitted in any suitable way—e.g., via a radio frequency communications channel or via electrostatic communication.

Continuing with FIG. 4, at 404, method 400 includes classifying the user physical contact with the touch-sensitive input region as a recognized contact type of a plurality of different recognized contact types, based at least in part on one or more touch context parameters. Non-limiting examples of suitable touch context parameters that may be considered will be described in more detail below. At 406, method 400 includes activating the haptic feedback device with predefined characteristics corresponding to the recognized contact type. Notably, the predefined haptic characteristics may differ from other predefined haptic characteristics corresponding to other recognized contact types of the plurality of different recognized contact types. Thus, the haptic experience provided to the user (e.g., location, duration, frequency, intensity) may be different depending on the manner and circumstances in which the user contacts the touch-sensitive input region of the electronic stylus.

Figure 5:
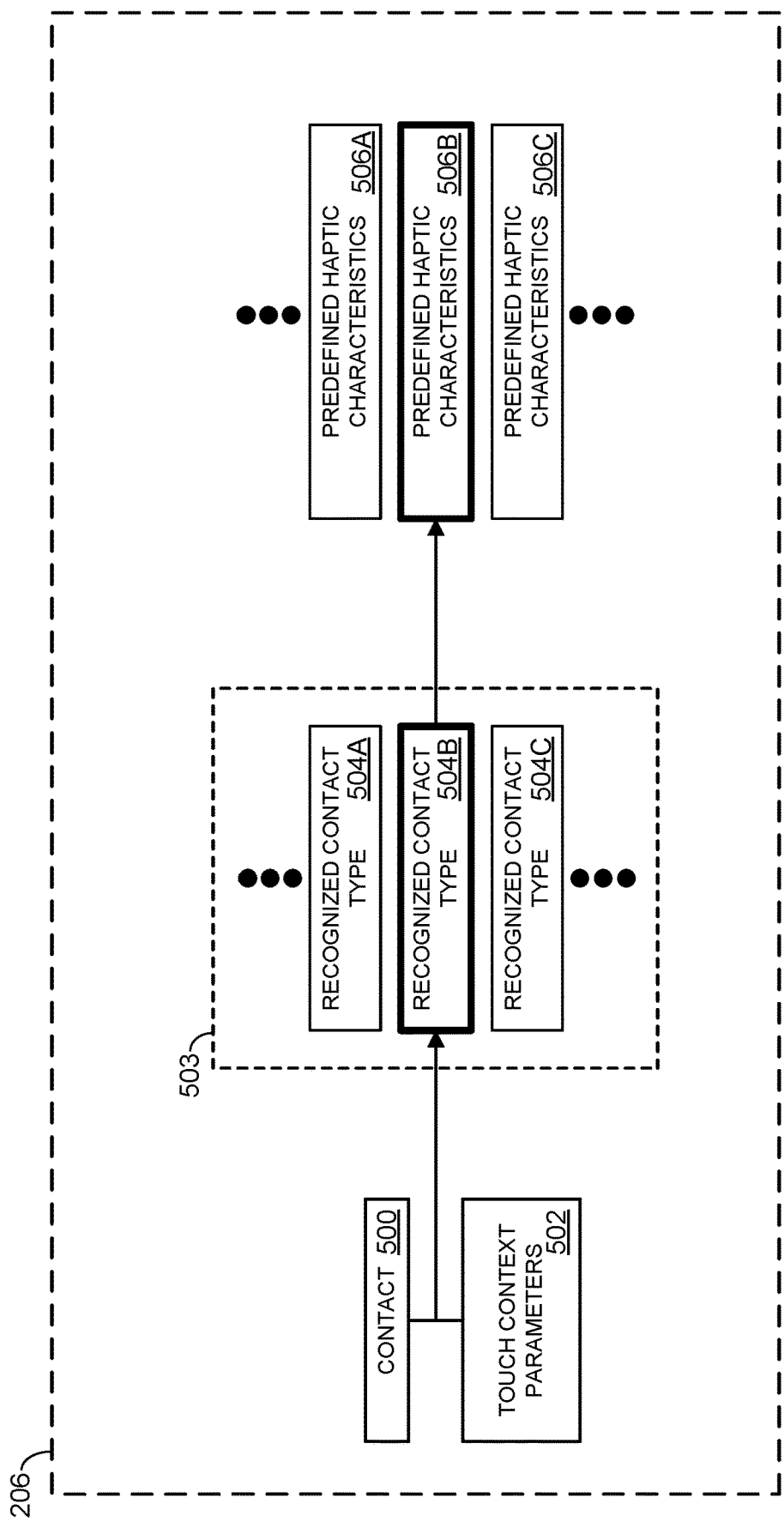
FIG. 5 schematically illustrates classifying a user physical contact with a touch-sensitive input region as a recognized contact type.

This is schematically illustrated with respect to FIG. 5. As shown, stylus controller 206 receives an indication of a user physical contact 500 with a touch-sensitive input region (e.g., taking the form of one or more two-dimensional coordinates corresponding to the detected position of the contact). Based at least in part on one or more touch context parameters 502, the stylus controller classifies the user physical contact as a recognized contact type 504B from a plurality of different recognized contact types 503. Recognized contact type 504B corresponds to a set of predefined haptic characteristics 506B, where other recognized contact types 504A and 504C correspond to other sets of predefined haptic characteristics 506A and 506C. It will be understood that the stylus controller may maintain any number of different recognized contact types, and each of these different recognized contact types may correspond to different predefined haptic characteristics.

A "touch context parameter" may include any variety of different information pertaining to the detected user physical contact with the touch-sensitive input region, the current status of the electronic stylus, and/or the current status of a host computing device that the electronic stylus is communicatively coupled with. As one non-limiting example, the one or more touch context parameters may include a length of time since a previous user physical contact with the touch-sensitive input region was detected. Thus, the determination as to whether to provide haptic feedback in response to a detected contact, and/or the predefined haptic characteristics of the haptic feedback, may depend at least in part on the length of time since a previous contact was detected.

For example, as discussed above, the touch-sensitive input region may in some cases have a similar appearance and/or tactile feel to other portions of the electronic stylus that are not touch sensitive. As such, when the stylus controller detects contact at the touch-sensitive input region, the stylus controller may provide a pulse of haptic feedback as an indication to the user that they have "found" the touch-sensitive input region—e.g., by touching it with their finger. In this case, the detected user physical contact with the touch-sensitive input region may be referred to as a "contact-initiating touch input."

However, it may be unnecessary or distracting for the electronic stylus to provide haptic feedback each time any contact at the touch-sensitive input region is detected. For example, if the user has recently been providing input to the touch-sensitive input region (e.g., within the last few seconds), then it is likely that the user remembers the location of the touch-sensitive input region, and does not need a haptic pulse to serve as an indication that they have again "found" the touch-sensitive input region. Thus, in some examples, the stylus controller may classify a detected user physical contact with the touch-sensitive input region as a contact-initiating touch input based at least in part on the length of time since the previous user physical contact exceeding a time threshold. Any suitable value may be used for the time threshold—such as 2 seconds, 5 seconds, or 10 seconds, as non-limiting examples.

This is schematically illustrated with respect to FIG. 6A, which again shows electronic stylus 108. As shown, the electronic stylus has detected a user physical contact 600 (represented as a black circle) on the touch-sensitive input region 202—e.g., corresponding to presence of a human digit (not shown). The stylus controller tracks a length of time 601 since a previous user physical contact was detected at the touch-sensitive input region. Based at least in part on the length of time since the previous user physical contact exceeding a time threshold, the contact 600 may be classified as a contact-initiating input.

Figure 6A:
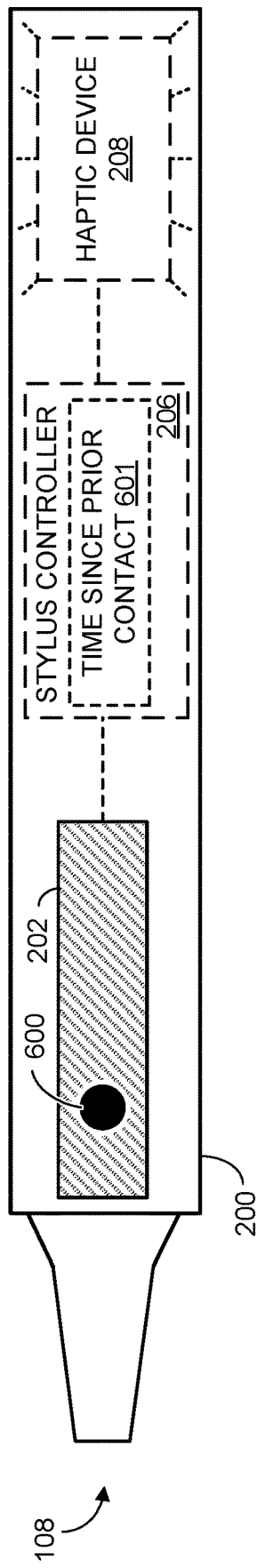
FIGS. 6A and 6B schematically illustrate different user physical contacts detected on a touch-sensitive input region.

The stylus controller may then activate the haptic feedback device 208 with predefined haptic characteristics corresponding to the contact-initiating touch input. In FIG. 6A, and in other FIGS. described herein, activity of a haptic feedback device is indicated by dashed lines extending away from the schematic representation of the haptic feedback device (e.g., as is shown for haptic feedback device 208). The specific haptic feedback provided after detecting a contact-initiating touch input may take any suitable form. As discussed above, it may be beneficial if, after the stylus controller detects a contact-initiating touch input, the electronic stylus provides a relatively short pulse of haptic feedback as an indication to the user that they have begun contacting the touch-sensitive input region. Thus, the stylus controller may activate the haptic feedback device with predefined haptic characteristics defining a haptic pulse having a specified pulse duration and pulse intensity.

Any suitable values for the specified pulse duration and pulse intensity may be used. It may be desirable for the pulse to have a relatively low duration and/or intensity, so as to be noticeable to the user without being distracting or disruptive. As non-limiting examples, the specified pulse duration may be 10 ms, 30 ms, 50 ms, etc. Similarly, the pulse intensity may correspond to a haptic acceleration force of 0.25 G, 0.5G, 1G, etc. Furthermore, in some cases, the specified pulse duration and/or pulse intensity may be specified by a human user of the active stylus. For example, the human user may interact with configuration software on a host computing device communicatively coupled with the electronic stylus to adjust haptic feedback settings of the stylus. Such settings may in some cases be saved in a user profile, as will be described in more detail below.

In addition to or instead of the length of time since a previous user physical contact was detected at the touch-sensitive input region, the one or more touch context parameters may include a detected distance of a movement of the user physical contact across the touch-sensitive input region. Based at least in part on the detected distance of the movement exceeding a distance threshold, the user physical contact with the touch-sensitive input region may be classified as a "swipe input." Any suitable value may be used for the distance threshold—e.g., 2 mm, 5 mm, or 10 mm. Furthermore, in some cases, the contact may only be classified as a swipe input if the detected movement has a detected speed that exceeds a speed threshold—e.g., 1 mm/s. This may beneficially prevent the stylus controller from mis-categorizing different types of input directed to the touch-sensitive input region.

Figure 6B:
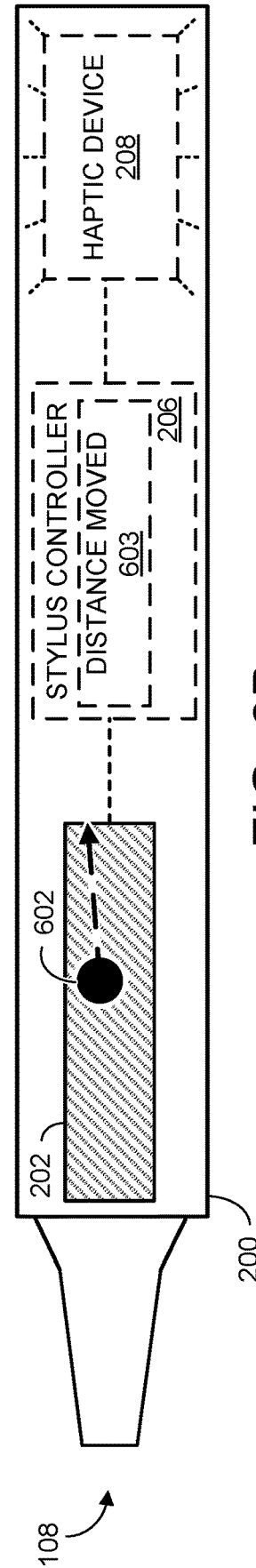

This is schematically illustrated with respect to FIG. 6B, again showing electronic stylus 108. In this example, a different user physical contact 602 is detected on touch-sensitive input region 202. However, in the example of FIG. 6B, the stylus controller detects a movement of the user physical contact across the touch-sensitive input region, as indicated by the dashed arrow extending away from the position of contact 602. The stylus controller may compare the detected distance 603 of this movement to a distance threshold, and based on the distance of the movement exceeding the threshold, the contact may be classified as a swipe input.

The stylus controller may then activate the haptic feedback device 208 with predefined haptic characteristics corresponding to the swipe input. As discussed above, in some cases the electronic stylus may include multiple different haptic feedback devices that can be controlled independently. Thus, as used herein, "activating the haptic feedback device" may in some cases include activating multiple haptic feedback devices at once, in the same or different ways (e.g., different haptic feedback devices may use different intensities, frequencies, or durations). The specific haptic feedback provided after detecting a swipe input may take any suitable form. As one example, the predefined haptic characteristics corresponding to the swipe input may specify a haptic feedback duration that lasts at least until the movement of the user physical contact across the touch-sensitive input region is discontinued. For example, upon classifying a detected contact at the touch-sensitive input region as a swipe input, the electronic stylus may begin providing haptic feedback that continues until the contact is no longer detected, at which point the haptic feedback may be stopped. Thus, the haptic feedback may beneficially provide persistent confirmation to the user that their input on the touch-sensitive input region is being recognized as the user continues the swipe input.

In other examples, the haptic feedback duration may continue for some length of time after the movement of the user physical contact across the touch-sensitive input region is no longer detected. For example, the haptic feedback duration may continue for a haptic momentum period after detecting that the movement of the user physical contact crosses beyond an edge of the touch-sensitive input region (e.g., characterized by detecting movement of the user physical contact that reaches the edge of the input region and is then no longer detected). In some examples, the length of the haptic momentum period may be proportional to a speed of the movement of the user physical prior to the contact crossing beyond the edge of the touch-sensitive input region. In other words, relatively faster movements across the touch-sensitive input region may result in haptic feedback being provided for a relatively longer amount of time, even after the user physical contact is no longer detected. This may beneficially provide the user with the impression that their input has momentum that varies depending on the input's speed, which may feel more intuitive to the human user (e.g., more consistent with an analog control system).

Notably, while this description focuses on the movement of the user physical contact extending beyond an edge of the touch-sensitive input region, this need not be the case. Rather, haptic feedback may be provided for a haptic momentum period any time a detected movement of a user physical contact across the touch-sensitive input region is discontinued, even if the contact is still detected on the touch-sensitive input region. For example, the user may begin and end a swipe gesture without crossing beyond an edge of the touch-sensitive input region.

The haptic intensity of the haptic feedback provided during a swipe input may vary depending on the implementation. As one example, the predefined haptic characteristics of the haptic feedback may define a function that proportionally changes the haptic intensity based on the detected speed of the movement of the user physical contact across the touch-sensitive input region. In other words, when the detected contact moves across the touch-sensitive input region relatively faster, the corresponding haptic feedback may have relatively higher intensity. This may beneficially provide the user with more insight into how their input is being interpreted by the active stylus, by varying the properties of the haptic feedback based at least in part on the specific inputs detected at the touch-sensitive input region.

In addition to or instead of the detected distance of a movement of the user physical contact across the touch-sensitive input region, the one or more touch context parameters may include one or more computer context indications received from a host computing device communicatively coupled with the electronic stylus. This is schematically illustrated with respect to FIG. 7A. As shown, electronic stylus 108 is communicatively coupled with a host computing device 700. As with host computing device 100 described above with respect to FIG. 1, host computing device 700 may take any suitable form, having any suitable capabilities, form factor, and hardware configuration.

In FIG. 7A, the electronic stylus receives one or more computer context indications 702 from the host computing device. As will be described in more detail below, the one or more computer context indications may specify any variety of different information regarding the current status or capabilities of the host computing device, and/or software (e.g., user-installable applications, an operating system) executed by the host computing device. Furthermore, in FIG. 7A, the electronic stylus detects a user physical contact 704A with the touch-sensitive input region 202. The specific information included in the one or more computer context indications may in some cases influence how contact 704 is classified, and thereby influence which predefined haptic characteristics are used for any haptic feedback provided in response to contact 704. Controlling haptic feedback based at least in part on computer context indications may beneficially enable more precise or granular control over haptic feedback behavior based on the current context of the host computing device—e.g., different haptic feedback behaviors may be associated with different software applications of the host computing device.

The electronic stylus may receive the one or more computer context indications from the host computing device in any suitable way, using any suitable communication protocol. For example, the one or more computer context indications may be transmitted to the electronic stylus using a suitable radio frequency communications channel, such as Bluetooth™. Additionally, or alternatively, the one or more computer context indications may be communicated to the electronic stylus electrostatically. For example, the host computing device may drive one or more display electrodes with a drive signal that encodes the data to be communicated. The drive signal supplied to the display electrodes may be detected at an internal electrode of the electronic stylus and decoded by the stylus controller.

Furthermore, different computer context indications may originate from individual software applications of the host computing device, and/or from the operating system of the host computing device. As one example, the host computing device may provide an application programming interface (API) that enables different software applications to send different indications or haptic instructions to the electronic stylus, while remaining agnostic as to the specific configuration details of the electronic stylus. The API may, for example, be implemented via an operating system of the host computing device, via a user installable application, and/or in any other suitable way.

The one or more computer context indications may take any suitable form. As will be described in more detail below, the one or more computer context indications can encode a wide variety of different information pertaining to the current status or context of the host computing device. Thus, the specific format used for each computer context indication can vary significantly depending on the implementation. In general, it will be understood that the one or more computer context indications may use a suitable predefined schema that can be interpreted by the electronic stylus.

Figure 7B:
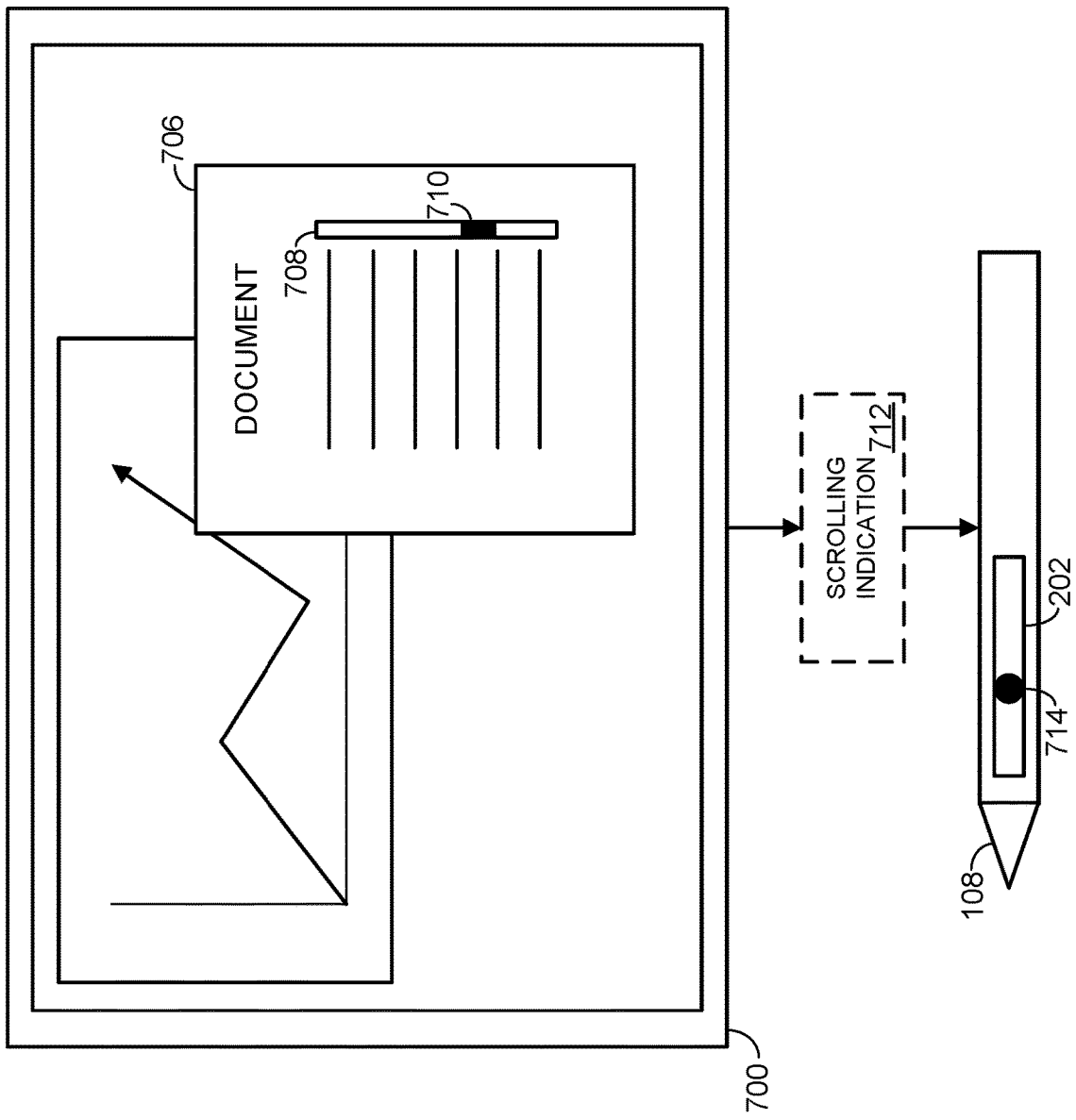

As one non-limiting example, the one or more computer context indications may include a scrolling indication, indicating that software of the host computing device supports scrolling of rendered graphical content in response to movement of the user physical contact across the touch-sensitive input region. This is schematically illustrated with respect to FIG. 7B, which shows another view of host computing device 700. As shown, host computing device 700 is rendering visual content for display, including a graphical user interface window 706 that corresponds to a document currently being viewed by a user. Interface window 706 includes a graphical scroll bar 708, which in turn includes a scroll position indicator 710. As a user scrolls through the document, the host computing device may correspondingly change the position of scroll position indicator 710 within the graphical scroll bar. It will be understood that the specific visual content shown in FIG. 7B is not limiting and presented only for the sake of illustration.

A human user may interact with the host computing device in any number of different ways in order to scroll through rendered visual content (e.g., the document shown in interface window 706). As one example, the user may cause scrolling of rendered visual content by providing input to the touch-sensitive input region of the electronic stylus— e.g., user physical contact 714 shown in FIG. 7B. For example, by moving their finger along the touch-sensitive input region (e.g., in a direction parallel to the longitudinal axis of the stylus), the user may cause scrolling of rendered graphical content on the host computing device.

Furthermore, while the user is providing input to the touch-sensitive input region, the electronic stylus may provide haptic feedback. In some cases, based at least in part on receiving a scrolling indication 712 from the host computing device, a detected user physical contact at the touch-sensitive input region (e.g., a contact that moves across the input region) may be classified as a "scrolling input." By contrast, if no scrolling indication is received, the same contact may be classified differently—e.g., as a swipe input. In some cases, a scrolling input may be a sub-type of swipe input, such that swipe inputs and scrolling inputs have a genus/species relationship.

It will be understood that any number of different software components (e.g., different software applications, or a device operating system) of the host computing device may cause rendering of scrollable graphical content. Thus, in some examples, different software components may independently provide scrolling indications—e.g., whenever that software component is running, currently targeted by user input, currently designated as an "active" interface window, and/or detects that a supported electronic stylus is in use. In other examples, the operating system of the host computing device may globally support scrolling of rendered content in response to input directed to a touch-sensitive input region of an electronic stylus. For example, the operating system may provide a single scrolling indication any time that scrollable graphical content is rendered. Upon receiving data from the electronic stylus indicative of a scrolling input (e.g., a detected contact that moves along the touch-sensitive input region), the operating system may cause scrolling of the graphical content, and/or provide the input to another software component that is causing display of the graphical content in a format that is interpretable by the software application.

The haptic feedback provided during a scrolling input may take any suitable form. For example, the predefined haptic characteristics of the haptic feedback may specify a duration that lasts at least as long as the scrolling continues. Furthermore, in some cases, the haptic intensity and/or frequency used during a scrolling input may differ from other recognized contact types (e.g., a scrolling input may "feel" different from a more general swipe input).

Figure 7C:
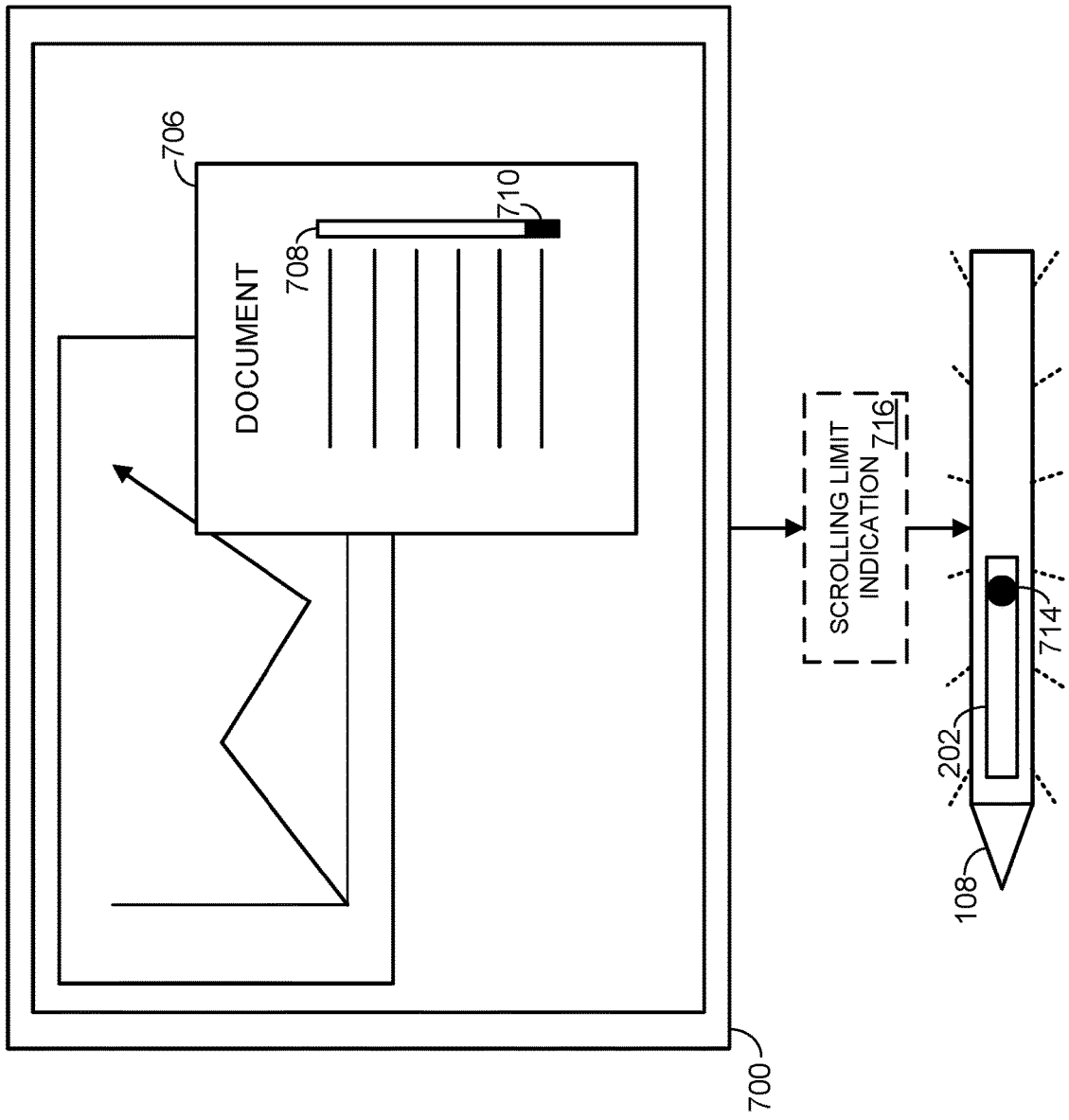

Additionally, or alternatively, the haptic feedback provided during a scrolling input may change depending on the current scrolling status of the graphical content. For example, the haptic feedback device of the electronic stylus may be activated based at least in part on receiving a scrolling limit indication from the host computing device, indicating that scrolling of the rendered graphical content has reached a scrolling limit. This is schematically illustrated with respect to FIG. 7C. In FIG. 7C, as compared to FIG. 7B, scrolling of the document shown in interface window 706 has reached a scrolling limit (as indicated by scroll position indicator 710 reaching the end of graphical scroll bar 708). This may be caused, for example, by movement of contact 714 across the surface of the touch-sensitive input region of the electronic stylus. This may beneficially serve to provide the user with more feedback regarding how their input is affecting the host computing device—e.g., haptic feedback indicates that the user has reached a scrolling limit.

In response, the host computing device transmits a scrolling limit indication 716 to the electronic stylus. The electronic stylus may then activate the haptic feedback device with predefined haptic characteristics corresponding to reaching a scrolling limit. For example, the haptic feedback may take the form of a relatively short pulse that has a different frequency and/or intensity from any haptic feedback provided during earlier scrolling—e.g., the haptic pulse may have a higher intensity than the earlier feedback provided during scrolling, to provide feedback to the user that they have reached the scrolling limit.

In this example, the scrolling limit is reached when scrolling reaches the end of a document. It will be understood, however, that this is non-limiting. In other cases, a scrolling limit may be reached when the beginning of a document is reached. Furthermore, it will be understood that any variety of rendered graphical content may be scrolled, in addition to or as an alternative to a "document." As examples, "scrolling" may refer to changing slides in a slideshow presentation, changing images in a photo gallery, scrolling a web page in a web browser, scrolling relative to one or more directions in a spreadsheet or drawing canvas, scrolling through operating system interface elements (e.g., a list of files or installed programs), etc.

It will be understood that the "scrolling indication" and "scrolling limit indication" described above are non-limiting examples of computer context indications that may be received from a host computing device, and considered by the electronic stylus when providing haptic feedback. As additional non-limiting examples, a computer context indication can specify one or more software applications currently running (e.g., different haptic feedback may be provided for different software applications); whether the stylus is currently providing touch input to a touch-sensitive display (e.g., haptic feedback corresponding to display touch inputs may supersede haptic feedback corresponding to detected contact on the stylus's touch-sensitive input region); the current position of an on-screen cursor (e.g., a tap directed at the touch-sensitive input region may be interpreted as a "selection" input based at least in part on receiving a context indication specifying that the on-screen cursor overlaps with an interactable user interface element); one or more hardware specifications of the host computing device; an identity of a currently logged in user to the host computing device (e.g., so that the electronic stylus can load corresponding user preferences), and/or any other suitable data corresponding to the current context of the host computing device.

In addition to, or as an alternative to computer context indications, the one or more touch context parameters can include positions of multiple contacts detected at the touch-sensitive input region. For instance, the present disclosure has thus far primarily focused on detection and classification of a single user physical contact with the touch-sensitive input region. It will be understood, however, that multiple contacts may be detected on the touch-sensitive input region at once. In such cases, the multiple contacts may, for example, correspond to different human digits of the same hand, or different portions of the same human digit that are each contacting the touch-sensitive input region. Thus, as one non-limiting example, the one or more touch context parameters can include positions of detected contacts between two or more human digits and the touch-sensitive input region. This may beneficially enable the stylus to provide different types of haptic feedback based on the positions of multiple different contacts (e.g., human fingers). For example, different haptic feedback behaviors may be used when the positions of the detected contacts are consistent with a "writing" grip as compared to a "shading" grip, in cases where the stylus is used to provide touch input to a host computing device with a touch-sensitive display.

In cases where multiple contacts are detected at the touch-sensitive input region, such contacts may in some cases be classified together as a single recognized contact type. For example, the positions of multiple contacts corresponding to different human digits may be used to evaluate a grip currently used by the user to hold the electronic stylus. Such information may be considered when providing haptic feedback. For example, upon detecting a contact that moves along the touch-sensitive input region, the electronic stylus may in some cases provide corresponding haptic feedback (e.g., consistent with a swipe input as described above). However, upon detecting other contacts at the touch-sensitive input region that are consistent with the user gripping the stylus in a manner consistent with writing, the stylus controller may classify the contact as a "writing" input or an "unintentional" input. Thus, the electronic stylus may change the characteristics of the haptic feedback, or refrain from providing haptic feedback at all.

As another example, when multiple contacts are detected at the touch-sensitive input region, the stylus controller may instead only focus on one particular contact. For example, the stylus controller may filter the detected contacts based on size (e.g., by ignoring any contacts that are too large or too small to correspond to a typical human finger), duration (e.g., the stylus controller may ignore relatively brief contacts), and/or movement (e.g., the stylus controller may ignore contacts that persist for a relatively long time without moving).

In addition to, or instead of detecting multiple contacts at the touch-sensitive input region, the one or more touch context parameters can include a distance between the haptic feedback device and the position of the user physical contact with the touch-sensitive input region. In such cases, the predefined haptic characteristics of any provided haptic feedback may define a function that proportionally changes a haptic intensity based on the distance between the haptic feedback device and the position of the user physical contact.

Figure 8A:
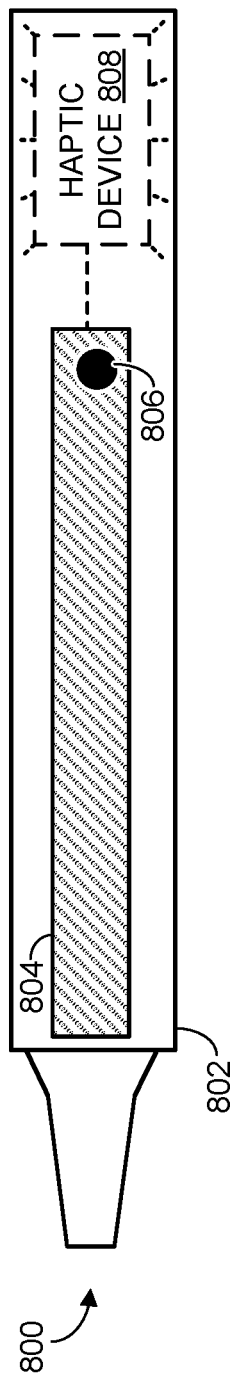
FIGS. 8A and 8B schematically illustrate different user physical contacts detected on a touch-sensitive input region at different distances away from a haptic feedback device.
Figure 8B:
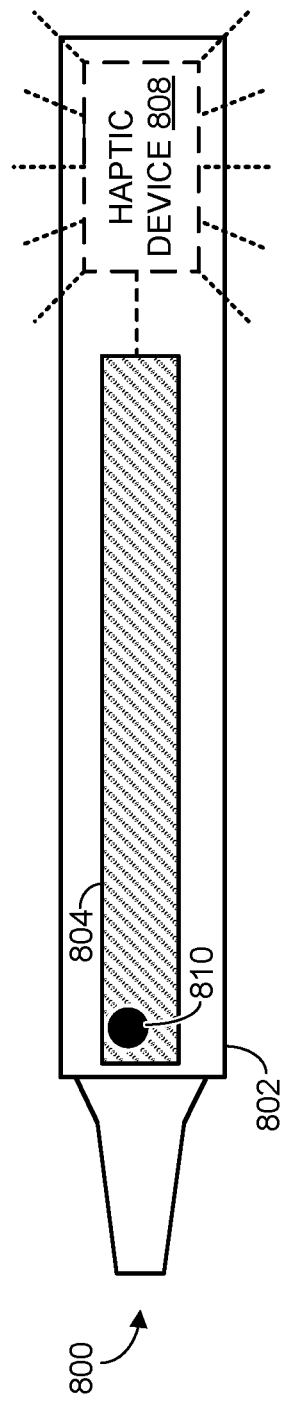

This is schematically illustrated with respect to FIGS. 8A and 8B. FIG. 8A schematically shows an example electronic stylus 800, including a stylus body 802 and a touch-sensitive input region 804 disposed along a portion of the stylus body. The touch-sensitive input region is currently detecting a user physical contact 806—e.g., corresponding to presence of a human digit (not shown). The electronic stylus also includes a haptic feedback device 808, which is being controlled to provide haptic feedback having relatively low intensity, as indicated by the size of the dashed arrows extending away from haptic feedback device 808. This is due to the fact that the position of contact 806 is relatively close to the position of haptic feedback device 808. Thus, any haptic feedback will likely have a higher perceived intensity from the perspective of the user, as the amount of distance-related attenuation affecting the perceived intensity of the haptic feedback may be relatively low. It will be understood that electronic stylus 800 may additionally have a stylus controller similar to stylus controller 206 described above, although the stylus controller is omitted from FIGS. 8A and 8B for the sake of visual clarity.

By contrast, in FIG. 8B, a different contact 810 is detected relatively far from the position of haptic feedback device 808. As such, the haptic feedback device is controlled to provide haptic feedback with a relatively higher intensity, as indicated by the longer dashed lines extending away from haptic feedback device 808. Because the position of the user's finger is relatively far from the haptic feedback device, distance-related attenuation may reduce the perceived intensity of the haptic feedback provided by the haptic feedback device. Thus, by increasing the intensity as is shown in FIG. 8B, the perceived intensity of the feedback from the user's perspective may be correspondingly increased.

As another non-limiting example, the touch context parameters can include data from other sensors or data sources on the electronic stylus. For example, the stylus controller may receive data relating to the stylus's current position, orientation, acceleration, etc., from one or more suitable on-board sensors (e.g., an inertial measurement unit).

Additionally, or alternatively, the touch context parameters can include explicit user settings. For example, the stylus controller may ordinarily provide haptic feedback in response to a scrolling limit indication, as discussed above. However, a human user of the stylus may find such haptic feedback to be distracting or unnecessary, and therefore disable it in device settings. In some cases, a user's designated settings may be saved in a profile on the electronic stylus, on the host computing device, and/or on a remote server, such that the same settings can be used regardless of which devices the user is currently using.

The present disclosure has described various different touch context parameters that may be considered by a stylus controller when providing haptic feedback, or determining whether to provide haptic feedback, in response to a detected contact at a touch-sensitive input region. It will be understood, however, that the specific touch context parameters described herein are not limiting and not exhaustive—e.g., any other touch context parameters may be considered in addition to, or instead of, those described herein. Furthermore, any or all of the touch context parameters may be considered at the same time. For example, when a detected contact at a touch-sensitive input region is classified as a "swipe" input, the specific haptic characteristics of any provided haptic feedback may be varied based on any received computer context indications, the distance between the contact and the haptic feedback device, etc.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
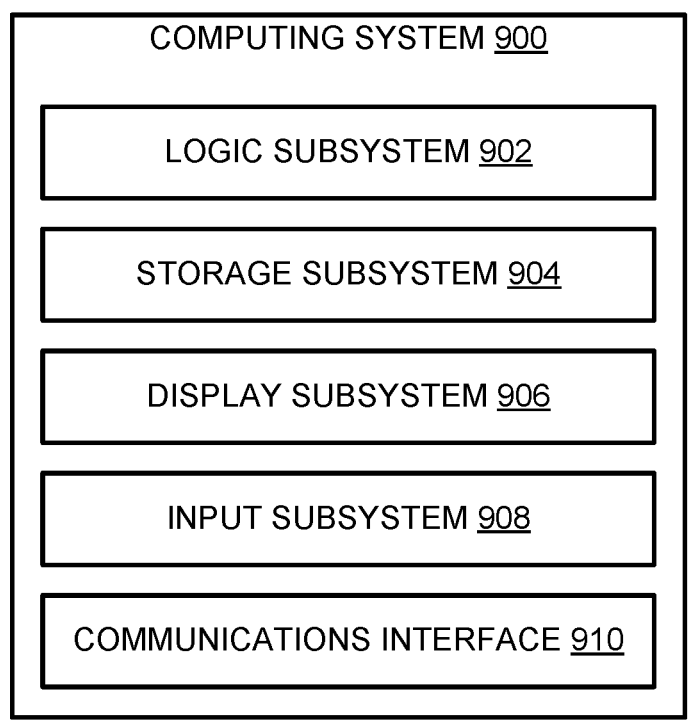
FIG. 9 schematically shows an example computing system.

FIG. 9 schematically shows a simplified representation of a computing system 900 configured to provide any to all of the compute functionality described herein. Computing system 900 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays.

When included, input subsystem 908 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, an electronic stylus comprises: a stylus body; a touch-sensitive input region disposed along at least a portion of the stylus body; a haptic feedback device; and a stylus controller configured to: receive, from the touch-sensitive input region, an indication of user physical contact with the touch-sensitive input region; classify the user physical contact with the touch-sensitive input region as a recognized contact type of a plurality of different recognized contact types, based at least in part on one or more touch context parameters; and activate the haptic feedback device with predefined haptic characteristics corresponding to the recognized contact type, and differing from predefined haptic characteristics corresponding to other recognized contact types of the plurality of different recognized contact types. In this example or any other example, the one or more touch context parameters include a length of time since a previous user physical contact with the touch-sensitive input region was detected. In this example or any other example, based at least in part on the length of time since the previous user physical contact exceeding a time threshold, the user physical contact is classified as a contact-initiating touch input. In this example or any other example, the predefined haptic characteristics corresponding to the contact-initiating touch input define a haptic pulse having a specified pulse duration and pulse intensity. In this example or any other example, the one or more touch context parameters include a detected distance of a movement of the user physical contact across the touch-sensitive input region, and the user physical contact is classified as a swipe input based at least in part on the detected distance of the movement exceeding a distance threshold. In this example or any other example, the predefined haptic characteristics corresponding to the swipe input specify a haptic feedback duration that lasts at least until the movement of the user physical contact across the touch-sensitive input region is discontinued. In this example or any other example, the haptic feedback duration continues for a haptic momentum period after detecting that the movement of the user physical contact crosses beyond an edge of the touch-sensitive input region. In this example or any other example, a length of the haptic momentum period is proportional to a speed of the movement of the user physical contact prior to the user physical contact crossing beyond the edge of the touch-sensitive input region. In this example or any other example, the predefined haptic characteristics define a function that proportionally changes a haptic intensity based at least in part on a detected speed of the movement of the user physical contact across the touch-sensitive input region. In this example or any other example, the one or more touch context parameters include one or more computer context indications received from a host computing device communicatively coupled with the electronic stylus. In this example or any other example, the one or more computer context indications include a scrolling indication that indicates software of the host computing device supports scrolling of rendered graphical content in response to movement of the user physical contact across the touch-sensitive input region. In this example or any other example, the haptic feedback device is activated based at least in part on receiving a scrolling limit indication from the host computing device, indicating that scrolling of the rendered graphical content has reached a scrolling limit. In this example or any other example, the one or more touch context parameters include positions of detected contacts between one or more human digits and the touch-sensitive input region. In this example or any other example, the one or more touch context parameters include a distance between the haptic feedback device and a position of the user physical contact with the touch-sensitive input region, and the predefined haptic characteristics define a function that proportionally changes a haptic intensity based at least in part on the distance between the haptic feedback device and the position of the user physical contact. In this example or any other example, the touch-sensitive input region is an elongate strip disposed along the stylus body. In this example or any other example, the touch-sensitive input region is a ring that encircles the stylus body.

In an example, a method for an electronic stylus comprises: at a stylus controller of the electronic stylus, receiving an indication of user physical contact with a touch-sensitive input region disposed along at least a portion of a stylus body of the electronic stylus; at the stylus controller, classifying the user physical contact with the touch-sensitive input region as a recognized contact type of a plurality of different recognized contact types, based at least in part on one or more touch context parameters; and at the stylus controller, activating a haptic feedback device of the electronic stylus with predefined haptic characteristics corresponding to the recognized contact type, and differing from predefined haptic characteristics corresponding to other recognized contact types of the plurality of different recognized contact types. In this example or any other example, the one or more touch context parameters include a length of time since a previous user physical contact with the touch-sensitive input region was detected, and, based at least in part on the length of time since the previous user physical contact exceeding a time threshold, the user physical contact with the touch-sensitive input region is classified as a contact-initiating touch input. In this example or any other example, the one or more touch context parameters include a scrolling indication that indicates software of the host computing device supports scrolling of rendered graphical content in response to movement of the user physical contact across the touch-sensitive input region.

In an example, an electronic stylus comprises: a stylus body; a touch-sensitive input region disposed along at least a portion of the stylus body; a haptic feedback device; and a stylus controller configured to: receive, from the touch-sensitive input region, an indication of user physical contact with the touch-sensitive input region; classify the user physical contact with the touch-sensitive input region as a recognized contact type of a plurality of different recognized contact types, based at least in part on one or both of a detected distance of a movement of the user physical contact across the touch-sensitive input region and a length of time since a previous user physical contact with the touch-sensitive input region was detected; and activate the haptic feedback device with predefined haptic characteristics specifying one or both of a haptic duration and a haptic intensity that correspond to the recognized contact type, and differing from predefined haptic characteristics corresponding to other recognized contact types of the plurality of different recognized contact types.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic stylus, comprising:
a stylus body;
a touch-sensitive input region disposed along at least a portion of the stylus body;
a haptic feedback device; and
a stylus controller configured to:
  receive, from the touch-sensitive input region, an indication of user physical contact with the touch-sensitive input region;
  classify the user physical contact with the touch-sensitive input region as a recognized contact type of a plurality of different recognized contact types, based at least in part on one or more touch context parameters, wherein the one or more touch context parameters include a length of time since a previous user physical contact with the touch-sensitive input region was detected; and
  activate the haptic feedback device with predefined haptic characteristics corresponding to the recognized contact type, and differing from predefined haptic characteristics corresponding to other recognized contact types of the plurality of different recognized contact types, wherein the predefined haptic characteristics corresponding to the recognized contact type define a haptic pulse having one or both of a specified haptic pulse feedback duration and a haptic pulse feedback intensity, and wherein the haptic pulse feedback intensity is based at least in part on a detected movement speed of a movement of the user physical contact across the touch-sensitive input region.

2. The electronic stylus of claim 1, wherein, based at least in part on the length of time since the previous user physical contact exceeding a time threshold, the user physical contact is classified as a contact-initiating touch input.

3. The electronic stylus of claim 1, wherein the one or more touch context parameters include a detected distance of the movement of the user physical contact across the touch-sensitive input region, and wherein the user physical contact is classified as a swipe input based at least in part on the detected distance of the movement exceeding a distance threshold.

4. The electronic stylus of claim 3, wherein the predefined haptic characteristics corresponding to the swipe input specify a haptic feedback duration that lasts at least until the movement of the user physical contact across the touch-sensitive input region is discontinued.

5. The electronic stylus of claim 4, wherein the haptic feedback duration continues for a haptic momentum period after detecting that the movement of the user physical contact crosses beyond an edge of the touch-sensitive input region.

6. The electronic stylus of claim 5, wherein a length of the haptic momentum period is proportional to the detected movement speed of the movement of the user physical contact prior to the user physical contact crossing beyond the edge of the touch-sensitive input region.

7. The electronic stylus of claim 1, wherein the one or more touch context parameters include one or more computer context indications received from a host computing device communicatively coupled with the electronic stylus.

8. The electronic stylus of claim 7, wherein the one or more computer context indications include a scrolling indication that indicates software of the host computing device supports scrolling of rendered graphical content in response to the movement of the user physical contact across the touch-sensitive input region.

9. The electronic stylus of claim 8, wherein the haptic feedback device is activated based at least in part on receiving a scrolling limit indication from the host computing device, indicating that scrolling of the rendered graphical content has reached a scrolling limit.

10. The electronic stylus of claim 1, wherein the one or more touch context parameters include positions of detected contacts between one or more human digits and the touch-sensitive input region.

11. The electronic stylus of claim 1, wherein the one or more touch context parameters include a distance between the haptic feedback device and a position of the user physical contact with the touch-sensitive input region, and wherein the predefined haptic characteristics define a function that proportionally changes the haptic pulse feedback intensity based at least in part on the distance between the haptic feedback device and the position of the user physical contact.

12. The electronic stylus of claim 1, wherein the touch-sensitive input region is an elongate strip disposed along the stylus body.

13. The electronic stylus of claim 1, wherein the touch-sensitive input region is a ring that encircles the stylus body.

14. A method for an electronic stylus, the method comprising:
at a stylus controller of the electronic stylus, receiving an indication of user physical contact with a touch-sensitive input region disposed along at least a portion of a stylus body of the electronic stylus;
at the stylus controller, classifying the user physical contact with the touch-sensitive input region as a recognized contact type of a plurality of different recognized contact types, based at least in part on one or more touch context parameters, wherein the one or more touch context parameters include a length of time since a previous user physical contact with the touch-sensitive input region was detected; and
at the stylus controller, activating a haptic feedback device of the electronic stylus with predefined haptic characteristics corresponding to the recognized contact type, and differing from predefined haptic characteristics corresponding to other recognized contact types of the plurality of different recognized contact types, wherein the predefined haptic characteristics corresponding to the recognized contact type define a haptic pulse having one or both of a specified haptic pulse feedback duration and a haptic pulse feedback intensity, and wherein the haptic pulse feedback intensity is based at least in part on a detected movement speed of a movement of the user physical contact across the touch-sensitive input region.

15. The method of claim 14, wherein, based at least in part on the length of time since the previous user physical contact exceeding a time threshold, the user physical contact with the touch-sensitive input region is classified as a contact-initiating touch input.

16. The method of claim 14, wherein the one or more touch context parameters include a scrolling indication that indicates software of the host computing device supports scrolling of rendered graphical content in response to the movement of the user physical contact across the touch-sensitive input region.

17. The method of claim 14, wherein the one or more touch context parameters include a detected distance of the movement of the user physical contact across the touch-sensitive input region, and wherein the user physical contact is classified as a swipe input based at least in part on the detected distance of the movement exceeding a distance threshold.

18. The method of claim 14, wherein the one or more touch context parameters include a distance between the haptic feedback device and a position of the user physical contact with the touch-sensitive input region, and wherein the predefined haptic characteristics define a function that proportionally changes the haptic pulse feedback intensity based at least in part on the distance between the haptic feedback device and the position of the user physical contact.

19. An electronic stylus, comprising:
a stylus body;
a touch-sensitive input region disposed along at least a portion of the stylus body;
a haptic feedback device; and
a stylus controller configured to:
receive, from the touch-sensitive input region, an indication of user physical contact with the touch-sensitive input region;
classify the user physical contact with the touch-sensitive input region as a recognized contact type of a plurality of different recognized contact types, based at least in part on one or both of a detected distance of a movement of the user physical contact across the touch-sensitive input region and a length of time since a previous user physical contact with the touch-sensitive input region was detected; and
activate the haptic feedback device with predefined haptic characteristics specifying one or both of a haptic duration and a haptic intensity that correspond to the recognized contact type, and differing from predefined haptic characteristics corresponding to other recognized contact types of the plurality of different recognized contact types, wherein the haptic intensity is based at least in part on a detected movement speed of the movement of the user physical contact across the touch-sensitive input region.

\* \* \* \* \*